(12) United States Patent
Wei

(10) Patent No.: US 10,207,896 B2
(45) Date of Patent: Feb. 19, 2019

(54) ELEVATOR MACHINE BRAKE CONTROL

(71) Applicant: OTIS ELEVATOR COMPANY, Farmington, CT (US)

(72) Inventor: Wei Wei, Farmington, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 8 days.

(21) Appl. No.: 15/419,332

(22) Filed: Jan. 30, 2017

(65) Prior Publication Data

US 2018/0215576 A1 Aug. 2, 2018

(51) Int. Cl.
B66B 1/32 (2006.01)
B66B 1/44 (2006.01)
F16D 5/00 (2006.01)
F16D 59/00 (2006.01)
F16D 123/00 (2012.01)

(52) U.S. Cl.
CPC .................. B66B 1/44 (2013.01); B66B 1/32 (2013.01); F16D 5/00 (2013.01); F16D 59/00 (2013.01); F16D 2123/00 (2013.01)

(58) Field of Classification Search
CPC ........................................................ B66B 1/32
USPC .................................................. 187/391–394
See application file for complete search history.

(56) References Cited

U.S. PATENT DOCUMENTS

| | | | |
|---|---|---|---|
| 2,886,137 A * | 5/1959 | Lund | B66B 1/3476 187/392 |
| 4,738,337 A | 4/1988 | Caputo | |
| 5,156,239 A | 10/1992 | Ericson et al. | |
| 5,323,878 A * | 6/1994 | Nakamura | B66B 1/32 187/264 |
| 5,780,786 A * | 7/1998 | Miyanishi | B66B 1/285 187/281 |
| 6,483,047 B1 * | 11/2002 | Zaharia | G01G 19/18 177/142 |
| 6,488,128 B1 | 12/2002 | Slabinski | |
| 6,971,496 B1 | 12/2005 | Nurnberg et al. | |
| 7,434,664 B2 | 10/2008 | Helstrom | |
| 7,527,127 B2 * | 5/2009 | Osterman | B66B 5/0031 187/288 |
| 7,735,610 B2 * | 6/2010 | Huard | B61B 12/10 187/287 |

(Continued)

FOREIGN PATENT DOCUMENTS

| | | |
|---|---|---|
| EP | 1939125 A1 | 7/2008 |
| EP | 1953107 | 8/2008 |

(Continued)

OTHER PUBLICATIONS

The Extended European Search Report for EP Application No. 18153881.0, dated Jun. 7, 2018.

*Primary Examiner* — David Warren
(74) *Attorney, Agent, or Firm* — Carlson, Gaskey & Olds

(57) ABSTRACT

An illustrative example embodiment of an elevator brake device includes a brake member configured to move into a braking position to resist movement of an elevator car associated with the brake device. A plurality of actuators are associated with the brake member and selectively controllable to apply a force to cause the brake member to move into the braking position. A brake controller determines a number of the actuators to activate based on a determined load of the elevator car associated with the brake device.

16 Claims, 3 Drawing Sheets

(56) References Cited

U.S. PATENT DOCUMENTS

| | | | | |
|---|---|---|---|---|
| 8,104,586 B2 * | 1/2012 | Traktovenko | ......... | B66B 1/3476 |
| | | | | 187/277 |
| 8,820,484 B2 * | 9/2014 | Rui | ........... | B66B 1/32 |
| | | | | 187/288 |
| 9,227,815 B2 | 1/2016 | Martinelli et al. | | |
| 2008/0073632 A1 * | 3/2008 | Kacy | ........... | B66B 1/32 |
| | | | | 254/375 |
| 2013/0105248 A1 * | 5/2013 | Martinelli | ........... | B66B 1/32 |
| | | | | 187/288 |
| 2014/0158476 A1 | 6/2014 | Wei | | |
| 2016/0152440 A1 * | 6/2016 | Hopp | ........... | B66B 29/00 |
| | | | | 198/323 |
| 2016/0376123 A1 * | 12/2016 | Lotfi | ........... | B66D 5/30 |
| | | | | 187/250 |
| 2017/0029243 A1 * | 2/2017 | Lotfi | ........... | B66D 5/30 |
| 2017/0101289 A1 * | 4/2017 | Stolt | ........... | B66B 1/304 |
| 2017/0349406 A1 * | 12/2017 | Illan | ........... | B66B 5/02 |

FOREIGN PATENT DOCUMENTS

| | | | |
|---|---|---|---|
| GB | 2153465 A | 8/1985 | |
| JP | H06219668 A | 8/1994 | |
| JP | 2001278572 | 10/2001 | |
| JP | 2009091089 | 4/2009 | |
| JP | 2009249160 | 10/2009 | |
| WO | 2010/104502 A1 | 9/2010 | |
| WO | 2016/022749 A1 | 2/2016 | |
| WO | 2016/040568 A1 | 3/2016 | |
| WO | 2016/124819 A1 | 8/2016 | |

* cited by examiner

ELEVATOR MACHINE BRAKE CONTROL

BACKGROUND

Elevator systems include a variety of devices for controlling movement of the elevator car. The elevator machine provides the force for moving the elevator car. Controlling operation of the machine is sufficient for accelerating and decelerating the elevator car between stops in response to elevator calls. A machine brake is typically applied when an elevator is stationary at a landing to assist in holding the car at a desired position.

To address situations in which the machine is, for some reason, not capable of controlling movement of the elevator car, elevator systems include emergency stopping devices that are referred to as safeties. Many such stopping devices engage the guide rails to prevent the elevator car from moving in an undesired manner. In some elevator systems a machine brake associated with the elevator machine may be applied during an emergency stop. Given that the elevator car may be moving at an undesirably high speed just prior to an emergency stop, the forces associated with the emergency stop can cause passenger discomfort and unease.

SUMMARY

An illustrative example embodiment of an elevator brake device includes a brake member configured to move into a braking position to resist movement of an elevator car associated with the brake device. A plurality of actuators are associated with the brake member and selectively controllable to apply a force to cause the brake member to move into the braking position. A brake controller determines a number of the actuators to activate based on a determined load of the elevator car associated with the brake device.

In a further non-limiting embodiment having one or more features of the device of the previous paragraph, the brake controller activates a first number of the actuators when the determined load is in a predetermined range. The brake controller activates a second, greater number of the actuators when the determined load is above the predetermined range.

In a further non-limiting embodiment having one or more features of the device of either of the foregoing paragraphs, the plurality of actuators consists of four actuators. The brake controller activates at least two of the actuators when the determined load is in the predetermined range. The brake controller activates at least three of the actuators when the determined load is above the predetermined range.

In a further non-limiting embodiment having one or more features of the device of any of the foregoing paragraphs, the brake controller activates four of the actuators whenever the determined load is above the predetermined range.

In a further non-limiting embodiment having one or more features of the device of any of the foregoing paragraphs, the brake controller activates all of the actuators when the determined load is between 50% and 100% of a maximum duty load of the elevator car associated with the brake device. The brake controller activates three-quarters of the actuators when the determined load is between 50% and 25% of the maximum duty load. The brake controller activates one-half of the actuators when the determined load is below 25% of the maximum duty load.

In a further non-limiting embodiment having one or more features of the device of any of the foregoing paragraphs, the brake controller activates the determined number of actuators in an emergency stop mode.

In a further non-limiting embodiment having one or more features of the device of any of the foregoing paragraphs, the brake member is configured to engage a rotatable surface that rotates with movement of the elevator car associated with the brake device and the actuators comprise calipers.

An illustrative example method of operating an elevator brake device, which includes a plurality of actuators associated with a brake member, includes, among other things, determining a load of an elevator car associated with the elevator brake device, selecting a number of the actuators to operate for moving the brake member into a braking position based on the determined load and activating the selected number of actuators to move the brake member into the braking position.

In a further non-limiting embodiment having one or more features of the method of the previous paragraph, the method includes activating a first number of the actuators when the determined load is in a predetermined range and activating a second, greater number of the actuators when the determined load is above the predetermined range.

In a further non-limiting embodiment having one or more features of the method of either of the foregoing paragraphs, the plurality of actuators consists of four actuators. The method comprises activating at least two of the actuators when the determined load is in the predetermined range and activating at least three of the actuators when the determined load is above the predetermined range.

In a further non-limiting embodiment having one or more feature so the method of any of the foregoing paragraphs, the method includes activating four of the actuators whenever the determined load is above the predetermined range.

In a further non-limiting embodiment having one or more feature so the method of any of the foregoing paragraphs, the method includes activating all of the actuators when the determined load is between 50% and 100% of a maximum duty load of the elevator car associated with the brake device, activating three-quarters of the actuators when the determined load is between 50% and 25% of the maximum duty load, and activating one-half of the actuators when the determined load is below 25% of the maximum duty load.

In a further non-limiting embodiment having one or more feature so the method of any of the foregoing paragraphs, the method includes activating the determined number of actuators in an emergency stop mode.

An elevator system according to another exemplary aspect of the present disclosure includes, among other things, an elevator car and an elevator drive machine that provides a force for moving the elevator car. The elevator drive machine includes a rotatable member that is associated with the elevator car such that the rotatable member rotates with vertical movement of the elevator car. The elevator drive machine includes a brake member that is configured to selectively engage the rotatable member, the elevator drive machine including a plurality of actuators that selectively cause the brake member to move into engagement with the rotatable member. A brake controller determines a number of the actuators to activate based on a determined load of the elevator car.

In a further non-limiting embodiment having one or more features of the system of the previous paragraph, the brake controller activates a first number of the actuators when the determined load is in a predetermined range and the brake controller activates a second, greater number of the actuators when the determined load is above the predetermined range.

In a further non-limiting embodiment having one or more features of the system of either of the foregoing paragraphs, the plurality of actuators consists of four actuators. The brake controller activates at least two of the actuators when the determined load is in the predetermined range and the brake controller activates at least three of the actuators when the determined load is above the predetermined range.

In a further non-limiting embodiment having one or more features of the system of any of the foregoing paragraphs, the brake controller activates four of the actuators whenever the determined load is above the predetermined range.

In a further non-limiting embodiment having one or more features of the system of any of the foregoing paragraphs, the brake controller activates all of the actuators when the determined load is between 50% and 100% of a maximum duty load of the elevator car. The brake controller activates three-quarters of the actuators when the determined load is between 50% and 25% of the maximum duty load. The brake controller activates one-half of the actuators when the determined load is below 25% of the maximum duty load.

In a further non-limiting embodiment having one or more features of the system of any of the foregoing paragraphs, the brake controller activates the determined number of actuators in an emergency stop mode.

In a further non-limiting embodiment having one or more features of the system of any of the foregoing paragraphs, load detectors on the elevator car provide an indication of the load to the brake controller.

Various features and advantages of at least one disclosed example embodiment will become apparent to those skilled in the art from the following detailed description. The drawings that accompany the detailed description can be briefly described as follows.

DETAILED DESCRIPTION

Embodiments of this invention provide customized control over the deceleration and braking forces associated with an emergency stop in an elevator system. The brake control is based on a current load of the elevator car and the resulting braking force is less likely to cause comfort or unease for a passenger in the elevator car.

Figure 1:
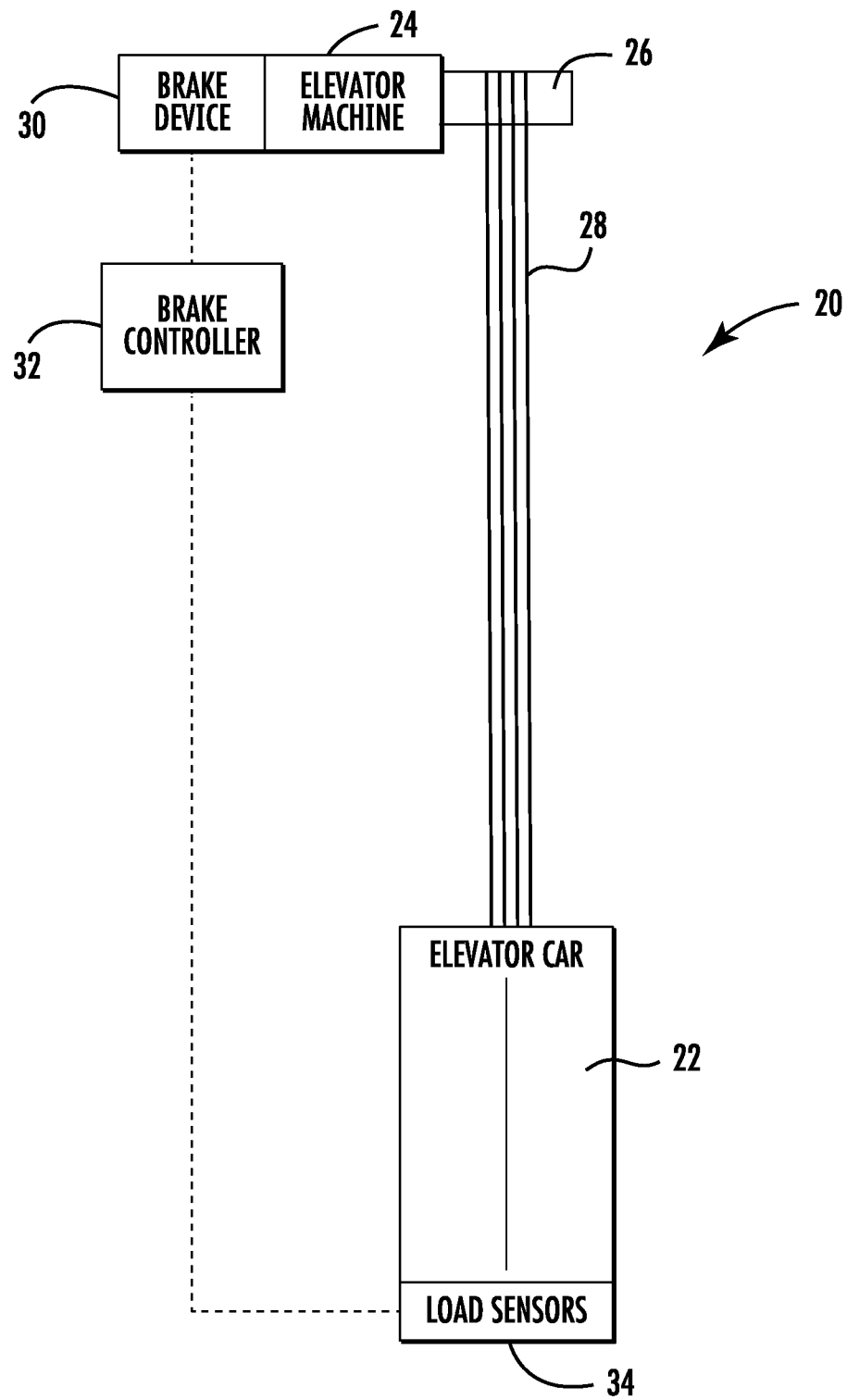
FIG. 1 schematically illustrates an elevator system designed according to an embodiment of this invention.

FIG. 1 schematically illustrates selected portions of an elevator system 20. In this example, an elevator car 22 is selectively moveable based on operation of an elevator machine 24 to provide elevator service among various landings. The elevator machine 24 rotates a traction sheave 26 to cause movement of a roping arrangement 28 when movement of the elevator car 22 is desired. While a traction-based elevator system is shown in FIG. 1 as an example embodiment, this invention is not necessarily limited to only traction-based elevator systems.

A brake device 30 is associated with the elevator machine 24. The brake device 30 may be used for assisting in holding the elevator car 22 stationary when parked at a landing. The brake device 30 in this example is also useful for an emergency stop when the elevator machine 24 is, for some reason, not able to maintain desired control over movement of the elevator car 22.

A brake controller 32 operates the brake device 30 in a manner to control the deceleration and forces associated with an emergency stop during which the brake device 30 is applied to prevent movement of the elevator car 22. The brake controller 32 utilizes information regarding a load of the elevator car 22 for purposes of customizing control over the brake device 30. In the illustrated example, load sensors 34 provide an indication of the load of the elevator car 22 to the brake controller 32. The brake controller 32 determines how to operate the brake device 30 based on the load information.

The brake controller 32 comprises a computing device such as a microprocessor that is suitably programmed or otherwise configured to perform brake control as described in this document. The brake controller 32 is a separate or dedicated device in some embodiments. In others, the brake controller 32 is a part of an elevator drive or electronics that are also used for controlling the machine 24.

Figure 2:
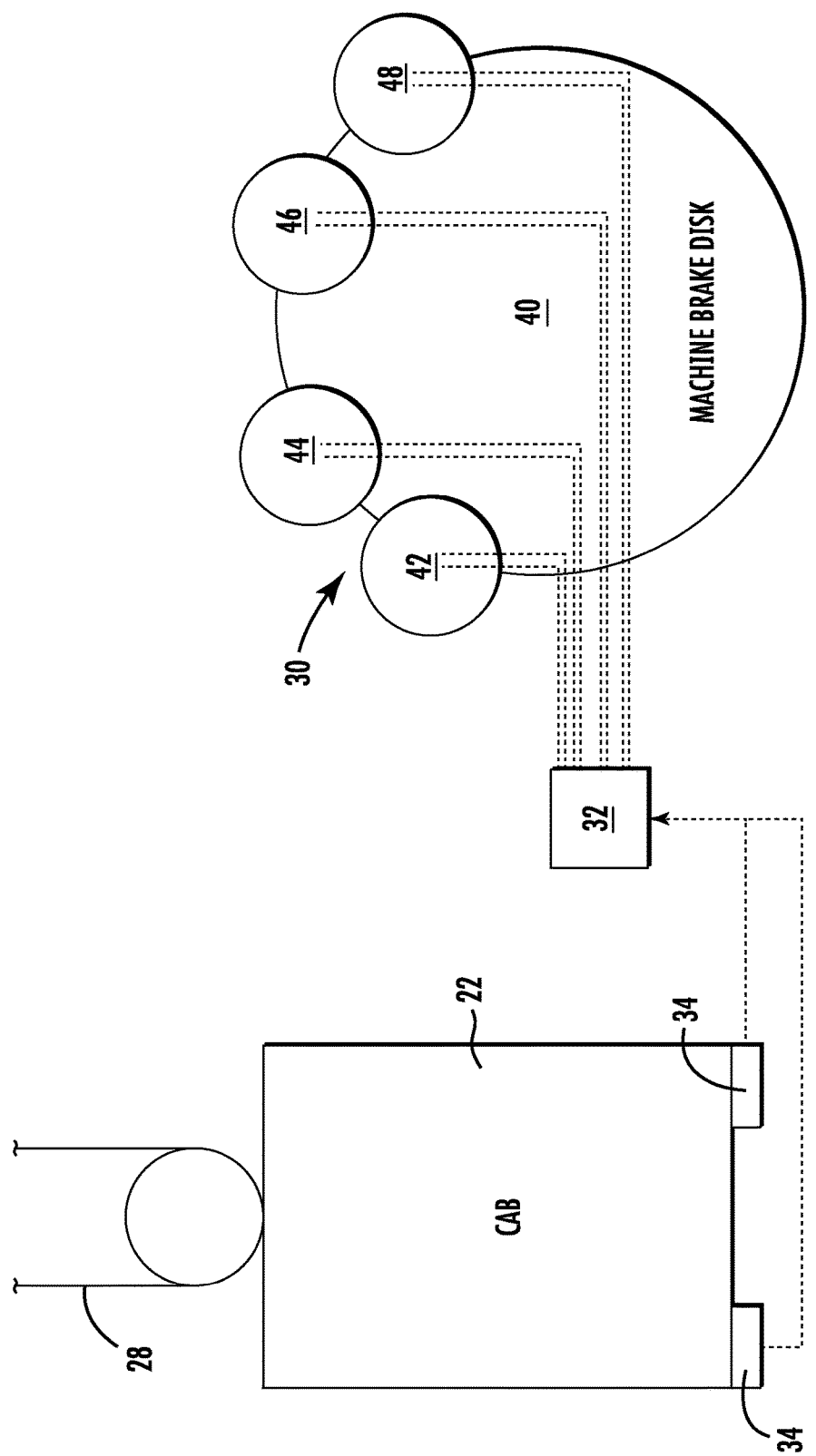
FIG. 2 schematically illustrates selected portions of an elevator system including an example brake device.

FIG. 2 schematically illustrates selected portions of the example elevator system 20. In this example, the brake device 30 includes a brake member 40, such as a machine brake disk. A plurality of brake actuators 42, 44, 46 and 48 respectively apply a force to the brake member 40 to move the brake member 40 into a braking position where the brake member 40 engages a portion of the elevator machine 24 to resist movement of the elevator car 22. In this example, the brake member 40 engages a rotatable member of the elevator machine 24 and prevents rotation of that member of the machine 24 to prevent movement of the elevator car 22.

In this example, the actuators 42-48 comprise brake calipers and the brake device 30 operates as a disk brake-style device. Other embodiments include different configurations of the brake device 30.

The brake controller 32 obtains information regarding the load of the elevator car 22 from the load sensors 34. The brake controller 32 selects a number of the actuators 42-48 to activate to apply a selected braking force yielding a corresponding level of deceleration of the elevator car 22 during an emergency stop. In this example, the elevator controller 32 is programmed to recognize whether the load of the elevator car 22 is within a predetermined range. When the load is within that range, the controller 32 activates a first number of the actuators 42-48. If the load is outside of the range and greater than the upper limit of the range, the brake controller 32 activates a second, greater number of the actuators 42-48. In some examples, when the load is outside of the predetermined range, the brake controller 32 activates all of the actuators 42-48.

Figure 3:
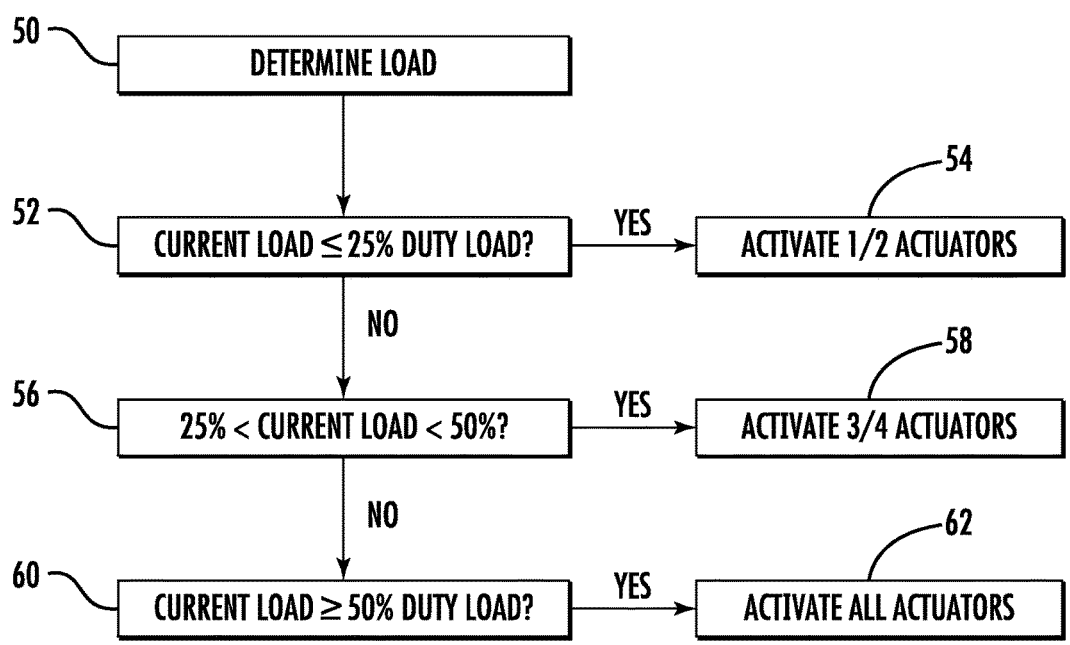
FIG. 3 is a flowchart diagram summarizing an example brake control technique.

FIG. 3 is a flowchart diagram summarizing one particular implementation. In this example, the brake controller 32 is programmed to use multiple ranges and different numbers of the actuators depending on where the current load of the elevator car 22 fits within those ranges.

In FIG. 3, at 50, the elevator controller 32 determines the load of the elevator car 22. The load determination in this example is made each time the elevator car departs from a landing.

At 52, the brake controller 32 determines whether the current load on the elevator car 22 is less than or equal to 25% of the maximum rated duty load for the elevator car 22. If so, the controller 32 determines that one-half of the actuators will be activated in an emergency stop condition as shown at 54.

Assuming that the load is greater than 25% of the rated duty load, the controller 32 determines at 56 whether the load is between 25% and 50% of the rated duty load. If so, the controller 32 selects three-quarters of the actuators for activation at 58 in the event of an emergency stop.

In the example of FIG. 3, the controller 32 determines at 60 whether the current load of the elevator car 22 is greater than or equal to 50% of the maximum duty load. In that condition, the controller 32 selects all of the actuators for purposes of applying the machine brake during an emergency stop as shown at 62.

The manner in which the load of the elevator car corresponds to a particular number of brake actuators may vary among different elevator systems. Given this description, those skilled in the art will realize how to select appropriate load thresholds or ranges and corresponding numbers of brake actuators to be able to suitably program a brake controller to meet their particular needs.

The disclosed example embodiments and others provide selective control over the operation of a machine brake during an emergency stop condition. The amount of braking force and deceleration is selectively controlled according to a current load of the elevator car. Such brake control allows for reducing the forces experienced by a passenger in an elevator car during an emergency stop.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. An elevator brake device, comprising:
a brake member configured to move into a braking position to resist movement of an elevator car associated with the brake device;
a plurality of actuators associated with the brake member, the actuators being selectively controllable to apply a force to cause the brake member to move into the braking position; and
a brake controller that determines a number of the actuators to activate based on a determined load of the elevator car associated with the brake device;
wherein
the brake controller activates a first number of the actuators when the determined load is in a predetermined range;
the brake controller activates a second, greater number of the actuators when the determined load is above the predetermined range;
the plurality of actuators consists of four actuators;
the brake controller activates at least two of the actuators when the determined load is in the predetermined range; and
the brake controller activates at least three of the actuators when the determined load is above the predetermined range.

2. The device of claim 1, wherein the brake controller activates four of the actuators whenever the determined load is above the predetermined range.

3. The device of claim 1, wherein
the brake controller activates all of the actuators when the determined load is between 50% and 100% of a maximum duty load of the elevator car associated with the brake device;
the brake controller activates three-quarters of the actuators when the determined load is between 50% and 25% of the maximum duty load;
the brake controller activates one-half of the actuators when the determined load is below 25% of the maximum duty load.

4. The device of claim 1, wherein the brake controller activates the determined number of actuators in an emergency stop mode.

5. The device of claim 1, wherein
the brake member is configured to engage a rotatable surface that rotates with movement of the elevator car associated with the brake device; and
the actuators comprise calipers.

6. A method of operating an elevator brake device that includes a plurality of actuators associated with a brake member, the method comprising:
determining a load of an elevator car associated with the elevator brake device;
selecting a number of the actuators to operate for moving the brake member into a braking position based on the determined load;
activating the selected number of actuators to move the brake member into the braking position;
activating all of the actuators when the determined load is between 50% and 100% of a maximum duty load of the elevator car associated with the brake device;
activating three-quarters of the actuators when the determined load is between 50% and 25% of the maximum duty load; and
activating one-half of the actuators when the determined load is below 25% of the maximum duty load.

7. The method of claim 6, comprising
activating a first number of the actuators when the determined load is in a predetermined range; and
activating a second, greater number of the actuators when the determined load is above the predetermined range.

8. The method of claim 7, wherein the plurality of actuators consists of four actuators and the method comprises
activating at least two of the actuators when the determined load is in the predetermined range; and
activating at least three of the actuators when the determined load is above the predetermined range.

9. The method of claim 8, comprising activating four of the actuators whenever the determined load is above the predetermined range.

10. The method of claim 6, comprising activating the determined number of actuators in an emergency stop mode.

11. An elevator system, comprising:
an elevator car;
an elevator drive machine that provides a force for moving the elevator car, the elevator drive machine including a rotatable member that is associated with the elevator car such that the rotatable member rotates with vertical movement of the elevator car, the elevator drive machine including a brake member that is configured to selectively engage the rotatable member, the elevator drive machine including a plurality of actuators that selectively cause the brake member to move into engagement with the rotatable member; and
a brake controller that determines a number of the actuators to activate based on a determined load of the elevator car;
wherein
the brake controller activates all of the actuators when the determined load is between 50% and 100% of a maximum duty load of the elevator car;
the brake controller activates three-quarters of the actuators when the determined load is between 50% and 25% of the maximum duty load; and the brake controller activates one-half of the actuators when the determined load is below 25% of the maximum duty load.

12. The system of claim 11, wherein
the brake controller activates a first number of the actuators when the determined load is in a predetermined range; and
the brake controller activates a second, greater number of the actuators when the determined load is above the predetermined range.

13. The system of claim 12, wherein
the plurality of actuators consists of four actuators;
the brake controller activates at least two of the actuators when the determined load is in the predetermined range; and
the brake controller activates at least three of the actuators when the determined load is above the predetermined range.

14. The system of claim 13, wherein the brake controller activates four of the actuators whenever the determined load is above the predetermined range.

15. The system of claim 11, wherein the brake controller activates the determined number of actuators in an emergency stop mode.

16. The system of claim 11, comprising
load detectors on the elevator car that provide an indication of the load to the brake controller.

* * * * *